Feb. 19, 1957     C. T. BAKER     2,782,361
PROTECTION CIRCUIT FOR SERIES TUBE REGULATION SYSTEM
Filed Feb. 19, 1954
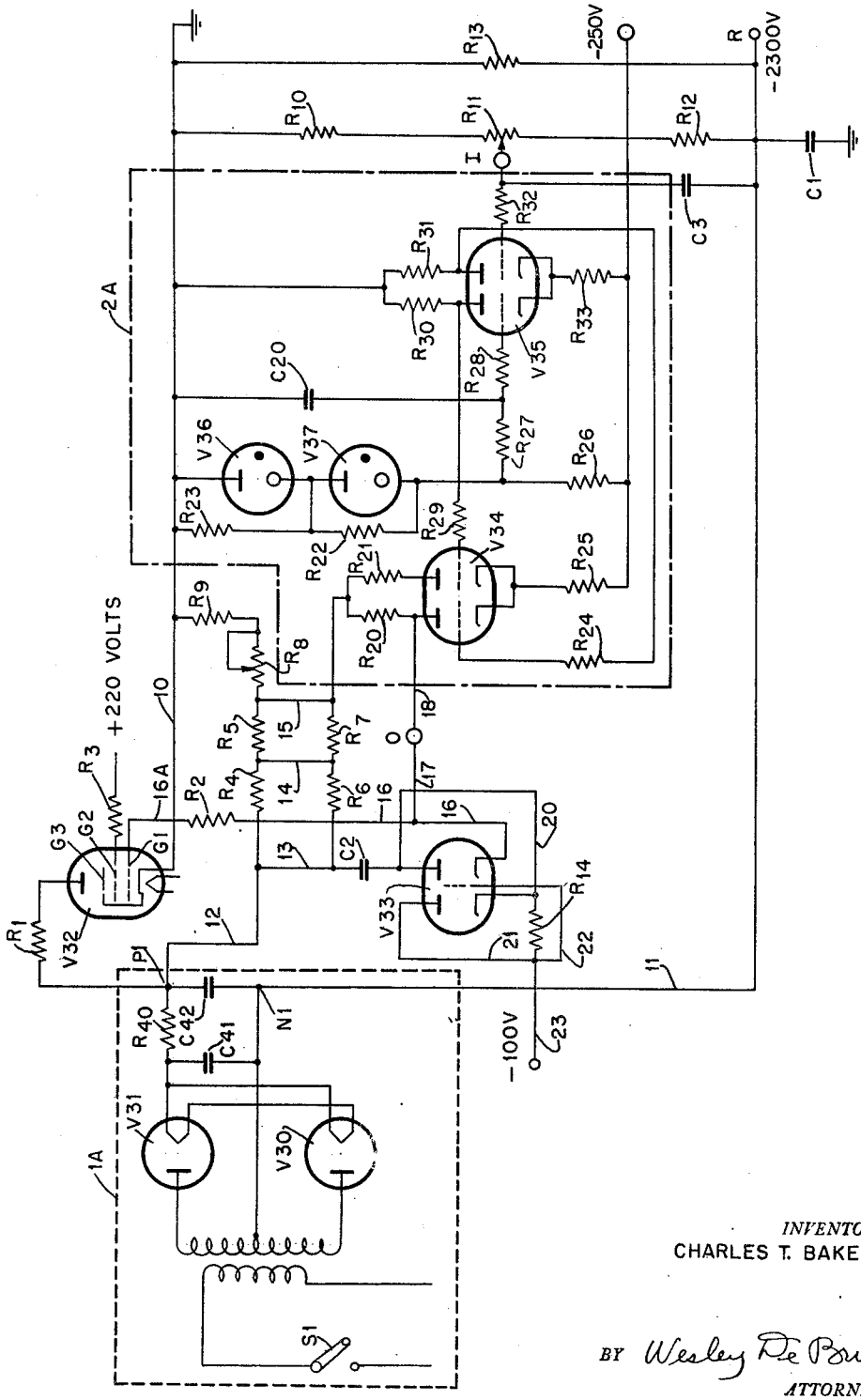
INVENTOR.
CHARLES T. BAKER
BY Wesley De Bruin
ATTORNEY

United States Patent Office 2,782,361
Patented Feb. 19, 1957

2,782,361

PROTECTION CIRCUIT FOR SERIES TUBE REGULATION SYSTEM

Charles T. Baker, Poughkeepsie, N. Y., assignor to International Business Machines Corporation, New York, N. Y., a corporation of New York Application February 19, 1954, Serial No. 411,302

4 Claims. (Cl. 323—22)

This invention relates to means for the regulation and control of direct current voltages and more particularly to means for protecting the regulator tube of a degenerative type direct current voltage regulator circuit.

In a high voltage direct current power supply the regulator tube will be damaged by an excessive transient voltage (which appears across the plate to cathode terminals) when the unregulated direct current potential is first applied and when it is interrupted or removed. The novel means, hereinafter disclosed in detail, limits at all times to a range well within the rating of the regulator tube the transient positive voltage and the transient negative voltage that is impressed across the regulator tube. In this manner the regulator tube is protected against transient voltage surges. How the invention may be practiced will appear clearly from the detailed description that follows.

The primary object of this invention is an improved high voltage direct current degenerative type voltage regulator circuit.

Another object of this invention is to prevent an excessive transient voltage drop from appearing across the plate to cathode of the series regulator tube used in a high voltage direct current power supply.

Still another object of this invention is to extend the life of a regulator tube used in a direct current power supply.

Yet another object of this invention is a simple and economical circuit for protecting a grid controlled tube against damage caused by transient voltage surges.

Other objects of the invention will be pointed out in the following description and claims and illustrated in the accompanying drawings, which disclose, by way of example, the principle of the invention and the best mode, which has been contemplated, of applying that principle.

The drawing consisting of a single figure discloses the invention embodied in a negative high voltage direct current degenerative type voltage regulator circuit.

Referring to the drawing the circuitry enclosed by broken line 1A is a source of unregulated direct current voltage represented by a conventional single phase full wave rectifier utilizing a resistor and a pair of capacitors as a smoothing filter. The positive terminal $P_1$ of the unregulated direct current voltage source 1A is connected through resistor $R_1$ to the plate of regulator tube V32. Regulator tube V32 is a pentode having its cathode connected to ground via lead 10. The negative terminal $N_1$ of the unregulated direct current voltage source is connected to lead 11. Capacitor $C_1$ is connected between lead 11 and ground. Resistors $R_{10}$, $R_{11}$, and $R_{12}$ are serially connected between lead 10 (i. e. ground) and lead 11. Resistor $R_{13}$ is connected in parallel with serially connected resistors $R_{10}$, $R_{11}$ and $R_{12}$.

Still referring to the drawing it will be seen that resistor $R_4$ and $R_6$ are connected in parallel by connecting leads 13 and 14, that resistors $R_5$ and $R_7$ are connected in parallel by connecting leads 14 and 15, and that the parallel-connected resistors $R_4$ and $R_6$ are connected in series with parallel-connected resistors $R_5$ and $R_7$. It is to be noted that positive terminal $P_1$ is connected through lead 12 to one side of the resistance network consisting of resistors $R_4$, $R_5$, $R_6$ and $R_7$, the other side of said resistance network is conected through variable resistor $R_8$ and resistor $R_9$ to lead 10. Now it will be apparent from the drawing that serially conected resistor $R_1$ and regulator tube V32 are shunted at all times by at least the resistance network consisting of resistors $R_4$, $R_5$, $R_6$, $R_7$, $R_8$ and $R_9$.

Still referring to the drawing, the broken line labelled 2A encloses direct coupled amplifier means of conventional design. Direct coupled amplifiers are well-known in the art. The direct-coupled amplifier means forms no part of the invention claimed in this application. Further, since any one of a number of well-known direct-coupled amplifiers could be used to practise the invention herein disclosed, it is deemed unnecessary to describe in detail the mode of operation of amplifier means 2A. It is sufficient to merely keep in mind that the input and output of amplifier means 2A must be in phase in order for the particular embodiment of the invention disclosed in the drawing to function properly.

Once again, referring to the regulator tube V32 shown in the drawing, it will be seen that its suppressor grid $G_3$ is connected to the cathode, its screen grid $G_2$ is connected through resistor $R_3$ to a positive potential of approximately 220 volts, and its control grid $G_1$ is connected through lead 16A, resistor $R_2$, lead 16 and lead 17 to terminal O, which is the output terminal of direct-coupled amplifier means 2A. It will also be noted that the cathode of the right diode (as viewed in the drawing) of twin diode tube V33 is connected through lead 16, resistor $R_2$ and lead 16A to the control grid of tube V32.

The input terminal I of the direct-coupled amplifier means 2A is connected through an adjustable tap to resistor $R_{11}$. The regulated direct current voltage (i. e. the output of the power supply) is taken from terminal R to ground.

Now overlooking for a moment the means for protecting the regulator tube against transient voltages, which will be described in detail herein below, the voltage-regulated power supply thus far described can be said to be a more or less conventional degenerative type voltage stabilizer.

Briefly, the voltage regulated power supply disclosed herein functions in the following maner. If the magnitude of the regulated output voltage (appearing at terminal R to ground) tends to rise because of an increase in the unregulated direct current voltage or a decrease in load current, the potential appearing at the input terminal I of direct-coupled amplifier means 2A also rises in magnitude, i. e., becomes more negative. Now, since the input voltage and output voltage of amplifier means 2A are in phase, it will be apparent that when the voltage at input terminal I goes more negative the output voltage at terminal O becomes less positive (or more negative). Now recalling that the control grid of regulator tube V32 is connected via lead 16A, resistor $R_2$, lead 16 and lead 17 to terminal O, it will be seen that when terminal O becomes less positive (or more negative) the voltage drop across regulator tube V32 will increase. In a corresponding manner, when the regulated direct current output voltage tends to decrease in magnitude because of a decrease in unregulated direct current voltage, or an increase in load current, the voltage drop across regulator tube V32 is decreased. This increase or decrease in the voltage dropped across regulator tube V32 will result in the regulated output voltage being held substantially constant.

The novel means for protecting the regulator tube V32 against an excessive transient voltage drop appearing across its plate to cathode when said tube is utilized (as shown in the drawing) in a negative high voltage direct current power supply will now be set forth in detail. It will be seen that the plate of the right diode (as viewed in the drawing) of twin diode V33 is connected through capacitor $C_2$, lead 13 and lead 12 to positive terminal $P_1$ of the unregulated direct current voltage source. Further, that the plate of the right diode of twin diode V33 is connected through lead 20 to the cathode of the left diode of twin diode V33. The plate of the left diode of twin diode V33 is connected through leads 21 and 23 to a negative (—) 100 volt potential. The cathode of the left diode of twin diode V33 is connected through resistor $R_{14}$ and lead 23 to the (—) 100 volt potential. The internal shield of twin diode V33 is connected through leads 22 and 23 to the negative (—) 100 volt potential.

In the drawing the unregulated source of direct current potential represented as a single phase full-wave rectifier enclosed within broken line 1A can be turned on by the closing of switch $S_1$ and turned off by the opening of switch $S_1$. For purpose of explanation let it be assumed that the power supply shown in the drawing is being viewed at the instant at which switch $S_1$ is closed. It will be observed that at the instant when switch $S_1$ is closed, in the absence of the protective circuit means, a high positive transient voltage would be impressed across the plate to cathode of the regulator tube V32. Actually, the high positive transient voltage would be in the order of the full unregulated voltage. This would occur since neither capacitor $C_1$ nor $C_3$ can change their voltage, i. e., charge up, instantly. From the drawing it is seen that capacitor $C_3$ is effectively connected between input terminal I of direct-coupled amplifier means 2A and lead 11 and that capacitor $C_1$ is effectively connected between lead 11 and ground. Therefore, at the instant at which switch $S_1$ is closed, there being no charge across capacitors $C_3$ or $C_1$, the negative potential from terminal $N_1$ of the unregulated direct current source impressed on lead 11 effectively appears at the grounded cathode of regulator tube V32. The positive potential appearing at terminal $P_1$ of the unregulated direct current source is impressed through resistor $R_1$ on the plate of regulator tube V32. It is also to be noted that as the input terminal I of direct-coupled amplifier means 2A goes negative (since at the instant switch $S_1$ is closed there is no charge on capacitor $C_3$) the output terminal O of said amplifier means goes negative and this negative potential is impressed via leads 17 and 16, resistor $R_2$, and lead 16A on control grid $G_1$ of regulator tube V32. This high negative potential on the control grid of regulator tube V32 will block its conduction and the high positive transient voltage will appear directly across the plate to cathode of said tube. In a high voltage power supply this transient voltage will exceed the rating of the regulator tube and damage it.

The novel protective means herein disclosed functions in the following manner to protect the regulator tube at the instant switch $S_1$ is closed. As the positive potential at $P_1$ of the unregulated direct current voltage source increases it is impressed through resistor $R_1$ on the plate of regulator tube V32 and through lead 12, lead 13, and capacitor $C_2$ on the plate of the right diode of twin diode V33. This will result in the right diode of twin diode V33 becoming conductive and a positive potential being impressed in lead 16, resistor $R_2$ and lead 16A on the control grid $G_1$ of regulator tube V32. This positive potential impressed upon the control grid of regulator tube V32 renders it conductive and the high transient voltage is thus precluded from building up across the plate to cathode of regulator tube V32. The current through the regulator tube at this time will not be excessive as it is limited by the internal resistance of the unregulated direct current voltage source and resistor $R_1$.

When switch $S_1$ is opened a high inverse voltage, that is, a high negative transient voltage will appear across the plate to cathode of regulator tube V32. In a high voltage power supply this negative transient voltage may well exceed the rating of the regulator tube and damage it. In order to avoid damage to the regulator tube when the power supply is turned off, the following circuitry is brought into play. When switch $S_1$ is opened, a transient potential of negative polarity rapidly builds up at terminal $P_1$ of the unregulated direct current voltage supply. This transient negative potential is impressed through resistor $R_1$ on the plate of regulator tube V32 and through lead 12, lead 13, capacitor $C_2$ and lead 20 on the cathode of the left diode of twin diode V33. It will be recalled that the plate of the left diode is connected through leads 21 and 23 to a negative (—) 100 volt potential and that the cathode of the left diode is connected through resistor $R_{14}$ and lead 23 to said negative (—) 100 volt potential. Thus it is seen that when the potential at terminal $P_1$ drops to a value more negative than minus 100 volts the left diode will become conductive and prevent said terminal from dropping appreciably below minus 100 volts.

From an inspection of the protective circuit means which essentially includes the capacitor $C_2$, twin diode V33, and resistor $R_{14}$, properly interconnected between a negative (—) 100 volt source, the positive terminal of the unregulated direct current voltage source, and the control grid of the regulator tube, it will be seen that during steady state operation of the regulated power supply the plate of the right diode and the cathode of the left diode of twin diode V33 will be at approximately negative (—) 100 volts. During normal steady state operation of the negative high voltage power supply, neither diode of twin diode V33 will be conductive.

Merely by way of example, and in no way limiting the scope of the invention, the following circuit parameters are set forth:

Tube V30 "Half-wave high-vacuum rectifier"—Type 1616
Tube V31 "Half-wave high-vacuum rectifier"—Type 1616
Tube V32 "Trasmitting beam power amplifier"—Type 807
Tube V33 "Twin diode"—Type 6AL5
Tube V34 "High-mu twin triode"—Type 12AX7
Tube V35 "High-mu twin triode"—Type 12AX7
Tube V36 "Voltage-reference tube"—Type 5651
Tube V37 "Voltage-reference tube"—Type 5651

| | ohms |
|---|---|
| $R_1$ | 47 |
| $R_2$ | 150 |
| $R_3$ | 5,000 |
| $R_4$ | 100,000 |
| $R_5$ | 100,000 |
| $R_6$ | 100,000 |
| $R_7$ | 100,000 |
| $R_8$ | 50,000 |
| $R_9$ | 47,000 |
| $R_{10}$ | 180,000 |
| $R_{11}$ | 10,000 |
| $R_{12}$ | 2,288,000 |
| $R_{13}$ | 200,000 |
| $R_{14}$ | 1,000,000 |
| $R_{20}$ | 100,000 |
| $R_{21}$ | 100,000 |
| $R_{22}$ | 1,000,000 |
| $R_{23}$ | 1,000,000 |
| $R_{24}$ | 2,200 |
| $R_{25}$ | 100,000 |
| $R_{26}$ | 33,000 |
| $R_{27}$ | 1,000,000 |
| $R_{28}$ | 2,200 |
| $R_{29}$ | 2,200 |
| $R_{30}$ | 220,000 |
| $R_{31}$ | 220,000 |
| $R_{32}$ | 2,200 |
| $R_{33}$ | 82,000 |
| $R_{40}$ | 500 |

| | | |
|---|---|---|
| $C_1$ | mfd | 2 |
| $C_2$ | mfd | 2 |
| $C_3$ | mfd | 1 |
| $C_{20}$ | mfd | 0.1 |
| $C_{41}$ | mfd | 4 |
| $C_{42}$ | mfd | 4 |

While there have been shown and described and pointed out the fundamental novel features of the invention as applied to a preferred embodiment, it will be understood that various omissions and substitutions and changes in the form and detail of the device illustrated and in its operation may be made by those skilled in the art, without departing from the spirit of the invention. It is the intention, therefore, to be limited only as indicated by the scope of the following claims.

What is claimed is:

1. A high voltage direct current regulated power supply having as its input a source of unregulated direct current voltage and rendering an output of substantially constant voltage, a regulator tube having a cathode, a control grid, and an anode, said regulator tube being connected between the input and output of said direct current regulated power supply, amplifier means coupling the output of said regulated power supply to the control grid of said regulator tube, whereby the grid potential and thus the conductivity of the regulator tube is varied in response to a change in output voltage of said power supply in such a manner that the output voltage of said power supply is maintained reasonably constant over a substantial range of load variation and, or variation in the magnitude of the unregulated direct current voltage, and protection circuit means for protecting said regulator tube against transient voltages, said protection circuit means including a first diode having its cathode connected to the control grid of said regulator tube and its anode coupled through a capacitor to the anode of said regulator tube, a second diode having its cathode directly connected to the anode of said first diode and its anode connected to a source of substantially constant potential, and a resistor shunting said second diode.

2. A high voltage direct current regulated power supply including a source of unregulated direct current voltage, amplifier means having an input and an output, a grid controlled regulator tube coupling said source of unregulated direct current voltage to the output of said amplifier means, said amplifier means having its input coupled to the output of said regulated power supply, and protective circuit means for protecting said grid controlled regulator tube against damage due to transient voltages, said protective circuit means including a first diode having a cathode and an anode, a second diode having a cathode and an anode, a resistor connected between the anode and cathode of said first diode, means directly connecting the cathode of said first diode to the anode of said second diode, means connecting the cathode of said second diode to the control grid of said grid-controlled regulator tube, means including a capacitor coupling the anode of said second diode to the anode of said grid-controlled regulator tube, and means for maintaining the anode of said first diode at a substantially fixed potential.

3. A high voltage direct current regulated power supply having as its input a source of unregulated direct current voltage and rendering an output of substantially constant voltage, an electron discharge device having a cathode, anode and control grid, said electron discharge device being serially connected between the input and output of said regulated power supply, amplifier means having its input coupled to the output of said regulated power supply and its output coupled to the grid of said electron discharge device, protection circuit means including a first diode having an anode and a cathode, a second diode having an anode and a cathode, a resistor connecting the anode of said first diode to the cathode of said first diode, a direct connection between the cathode of said first diode and the anode of said second diode, a capacitor and a resistor serially coupling the anode of said second diode to the anode of said electron discharge device, means directly connecting the cathode of said second diode to the output of said amplifier means and through a resistor to the control grid of said electron discharge device, and a potential source of substantially constant magnitude impressed across the anode of said first diode and the cathode of said electron discharge device.

4. A high voltage direct current regulated power supply having first and second input terminals and first and second output terminals, a source of unregulated direct current voltage impressed across said input terminals, an electron discharge device having a cathode, a control grid and an anode, a resistor coupling said first input terminal of said regulated power supply to the anode of said electron discharge device and means connecing the cathode of said electron discharge device to said first output terminal of said regulated power supply, a bleeder network and a capacitor connected across the output terminals of said regulated power supply, amplifier means having an input and an output, means connecting the input of said amplifier means to a tap on said bleeder network, a resistor connected between the output of said amplifier means and the control grid of said electron discharge device, a protection circuit for protecting said electron discharge device against damage due to transient voltages, said protection circuit including a first diode having a cathode and an anode, a second diode having a cathode and an anode, a resistor connected between the anode and cathode of said first diode, means directly connecting the cathode of said second diode to the output of said amplifier means, a capacitor for coupling the anode of said second diode to the first input terminal of said regulated power supply, and means for maintaining the anode of said first diode at a substantially fixed potential.

References Cited in the file of this patent

UNITED STATES PATENTS

| | | |
|---|---|---|
| 2,472,043 | Callender | May 31, 1949 |
| 2,569,204 | Stratton | Sept. 25, 1951 |
| 2,594,572 | Lupo | Apr. 29, 1952 |
| 2,609,524 | Greene | Sept. 2, 1952 |
| 2,632,143 | Goodwin | Mar. 17, 1953 |